United States Patent [19]

Hosie et al.

[11] Patent Number: 4,976,458
[45] Date of Patent: Dec. 11, 1990

[54] INTERNAL TIEBACK CONNECTOR

[75] Inventors: Stanley Hosie, Houston, Tex.; Luis A. G. Araujo, Rio de Janeiro, Brazil

[73] Assignee: Vetco Gray Inc., Houston, Tex.

[21] Appl. No.: 422,109

[22] Filed: Oct. 16, 1989

[51] Int. Cl.⁵ .............................................. F16L 35/00
[52] U.S. Cl. ........................................ 285/24; 285/39; 285/141; 285/921; 166/344; 166/348; 166/382
[58] Field of Search ....................... 285/27, 24, 39, 34, 285/35, 140, 141, 921; 166/344, 348, 382, 88, 86

[56] References Cited

U.S. PATENT DOCUMENTS

| | | | |
|---|---|---|---|
| 4,528,738 | 7/1985 | Galle, Jr. | 285/141 X |
| 4,550,782 | 11/1985 | Lawson | 285/141 X |
| 4,903,992 | 2/1990 | Jennings et al. | 285/24 |

Primary Examiner—Dave W. Arola
Assistant Examiner—Heather Chun
Attorney, Agent, or Firm—James E. Bradley

[57] ABSTRACT

A tieback system for a subsea well utilizes a tieback connector. The tieback connector has a body that lands on a wellhead housing located on a sea floor. A funnel extends downward from the body for sliding over the wellhead housing. A lockdown sub is carried by the body and has a set of tapered threads on its exterior. A lock ring is carried by the lockdown sub. The lock ring has an exterior profile for engaging an internal groove formed in the wellhead housing. Rotating the lockdown sub moves it downward from a recessed position to a locking position. In that position, the rotation causes makeup to the threads and causes the lock ring profile to tightly engage the groove in the wellhead housing.

3 Claims, 3 Drawing Sheets

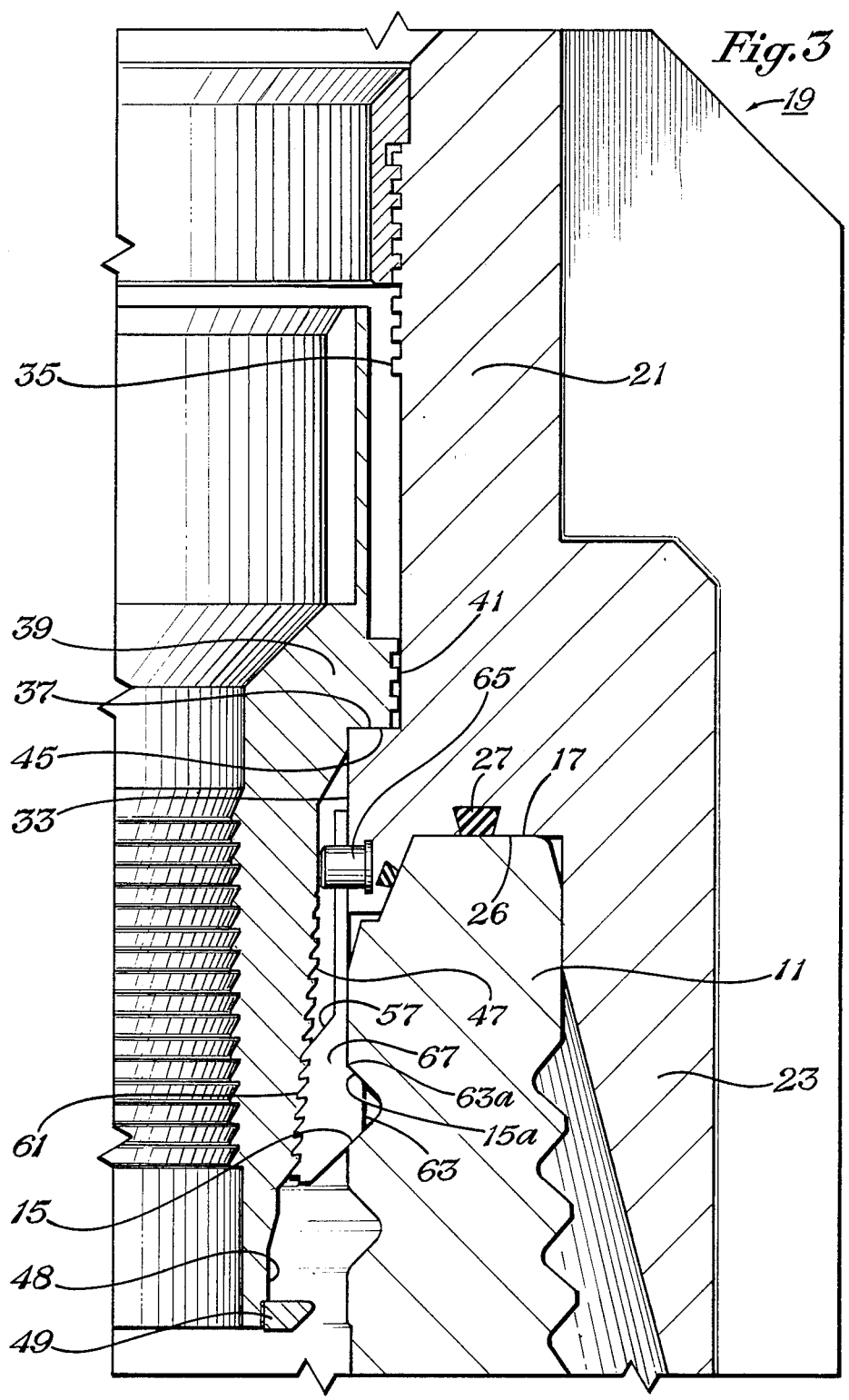

INTERNAL TIEBACK CONNECTOR

BACKGROUND OF THE INVENTION

1. Field of the Invention:

This invention relates in general to subsea well equipment, and in particular to an apparatus for tying back a wellhead housing located at the sea floor to the surface.

2. Description of the Prior Art:

One type of subsea well employs a wellhead housing located at the sea floor and the production Christmas tree located at the surface on a platform. Large diameter casing will be lowered from the surface down toward the wellhead housing. A tieback connector will connect the wellhead housing to the riser.

One type of tieback connector has a downward facing funnel that slides over the wellhead housing. The tieback connector has a body with a lock nut carried within an axial bore. After the funnel has landed the tieback connector body on the wellhead, a running tool will engage the lock nut and move it downward into the bore of the wellhead housing. Threads are provided in the wellhead housing for receiving external threads on the lock nut. The running tool rotates the lock nut to tighten the threads for pulling the tieback connector tightly against the wellhead housing.

While successful, a possibility exists that the internal threads in the wellhead housing could be damaged during earlier drilling operations. Most wellhead housings have large internal grooves which are used for various purposes. U.S. Pat. No. 4,696,493, Norman Brammer, issued Sept. 29, 1987, shows a tieback connector that utilizes these grooves for connecting the lock nut to the wellhead housing.

SUMMARY OF THE INVENTION

In this invention, a lock nut, or lock down sub carries a lock ring. The lock down sub has a conical exterior containing threads. The lock ring has a bore that contains mating threads. The lock ring is split and is compressed while carried in the running position.

After the tieback connector body lands, the running tool moves the lock down sub downward. The lock ring will spring outward. The lock ring has an exterior profile that mates with the internal grooves in the wellhead housing bore. The running tool rotates the lock down sub while a pin holds the lock ring stationary. This causes the threads on the conical surfaces to make up. This forces the lock ring tightly into engagement with the grooves, and pulls the lock nut downward to lock the tieback connector to the wellhead housing.

BRIEF DESCRIPTION OF THE DRAWINGS

FIG. 3 is a partial, enlarged sectional view of the tieback connector of FIG. 1, and shown in the locked position and shown in a different sectional plane than in FIG. 2.

DETAILED DESCRIPTION OF THE INVENTION

Figure 1:
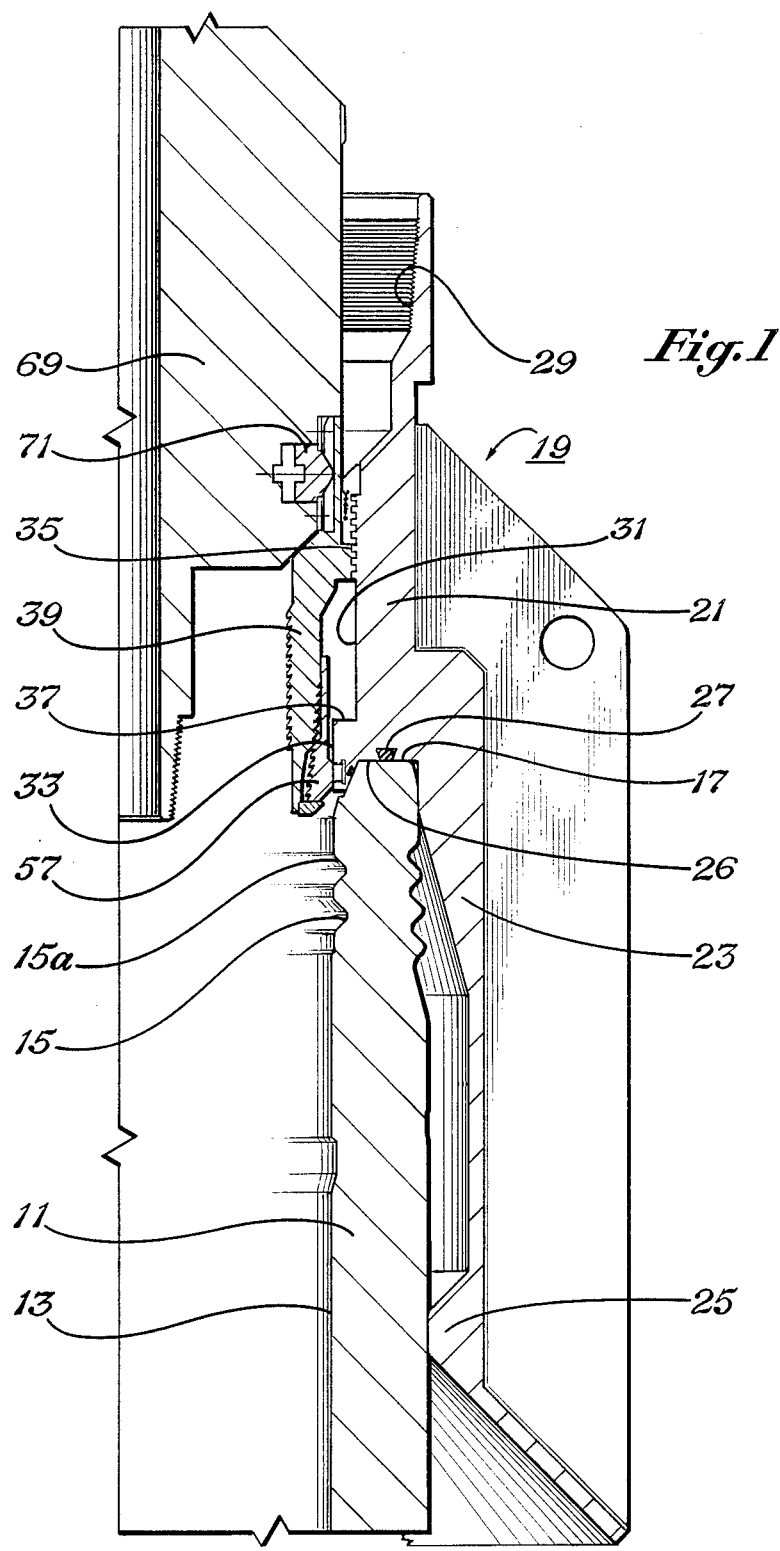
FIG. 1 is a vertical quarter sectional view of a tieback connector constructed in accordance with this invention, and shown prior to the tieback connector being connected to the wellhead housing.

Referring to FIG. 1, a portion of a wellhead housing 11 is shown. The wellhead housing 11 will be located near the floor of the sea. Wellhead housing 11 is a tubular member that extends vertically upward and has an axial bore 13. A pair of circumferential grooves 15 locate near the upper end of the bore 13. Each groove 15 has a generally downward facing frusto-conical shoulder 15a. A rim 17 locates at the upper end of bore 13 and is a flat surface perpendicular to the axis of bore 13.

Tieback connector 19 has a generally tubular body 21. A funnel 23 depends downward from body 21. Funnel 23 has an inner diameter that is larger than the outer diameter of wellhead housing 11 so that it will slide over it. An internal collar 25 locates at the lower end of funnel 23. Collar 25 is only slightly greater in diameter than the outer diameter of wellhead housing 11 so that it will provide a tight fit and resist bending loads. Funnel 23 has an annular internal seat 26 located at its upper end. Seat 26 lands on the rim 17. A seal 27 located at seat 26 provides sealing against the rim 17.

Body 21 has an upper portion containing threads 29 for connecting it to large diameter casing or riser conduit. Body 21 has a bore 31 that extends through it coaxially with the wellhead housing bore 13 when the tieback connector 19 has landed. Bore 31 has a reduced diameter section 33 located near the seat 26. The reduced diameter section 33 is approximately the same diameter as the bore 13, and less than the maximum diameter of the grooves 15.

A set of threads 35 are located within bore 31 above the reduced diameter section 33 and within a larger portion of bore 31. An upward facing shoulder 37 divides the reduced diameter section 33 from the upper portion of bore 31. Upward facing shoulder 37 locates in a plane perpendicular to the axis of bore 31.

Figure 2:
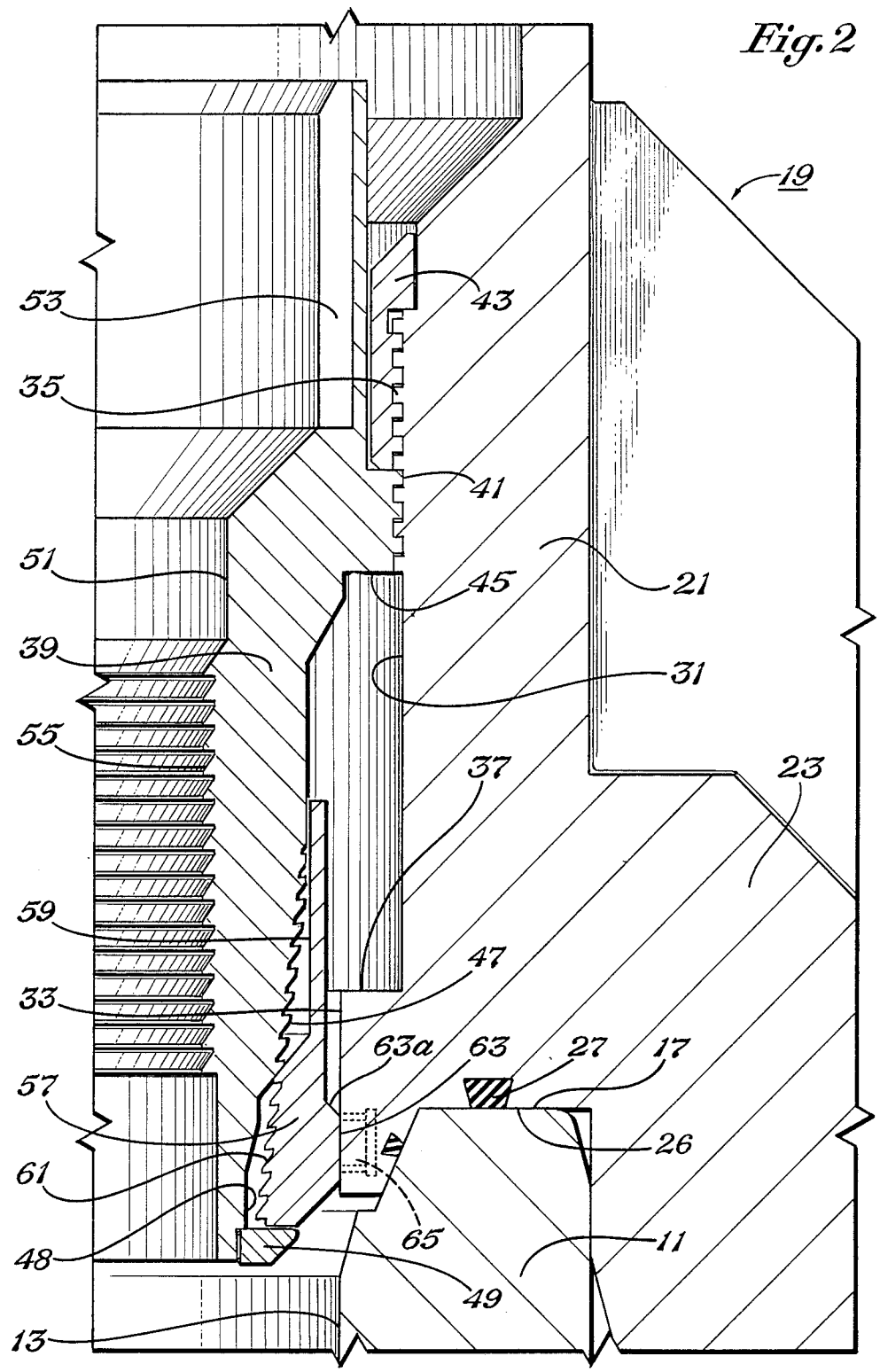
FIG. 2 is a partial enlarged sectional view of the tieback connector of FIG. 1, shown in the same position as in FIG. 1.

The tieback connector 19 has a lock nut or lockdown sub 39. Lockdown sub 39 is a tubular member that is carried in the bore 31 of the body 21. As shown in FIG. 2, the lockdown sub 39 has threads 41 on the exterior which will engage the threads 35 in the bore 31 of the body 21. A retainer 43 also engages the threads 35. Retainer 43 serves as an upper stop for the lockdown sub 39, preventing further upward movement. A downward facing shoulder 45 is on the exterior of lockdown sub 39 immediately below the threads 41. Shoulder 45 will land on the upward facing shoulder 37 when the lockdown sub 39 moves downward to locking position shown in FIG. 3.

The lockdown sub 39 has a frusto-conical section spaced a selected distance below the downward facing shoulder 45. This frusto-conical section contains threads 47. Threads 47 may be a single helical thread type or may be of a multistart type which will make up in less than one turn. A nose 48 extends downward from the lower termination of the thread 47. Nose 48 does not contain any threads and has an upper cylindrical portion, a tapered portion, and a lower cylindrical portion. A retainer ring 49 locates at the lower end of the nose 48.

A bore 51 extends axially through the lockdown sub 39. Bore 51 has an enlarged upper portion which contains a vertical slot 53. A lower portion of bore 51 is somewhat reduced in diameter and has a set of internal threads 55. Threads 55 may be used to connect other tieback equipment internally within the lockdown sub 39.

A lock ring 57 locates on the exterior of the lockdown sub 39. Lock ring 57 is a split ring that has an axial bore 59. A lower portion of bore 59 is frusto-conical and contains threads 61. The taper of the threads 61 matches the taper of the threads 47 and will engage the threads 47 when in the locked position. Initially, the lock ring 57 will be carried in a lower position relative to the lockdown sub 39, as shown in FIG. 2. In this lower or running position, the uppermost shoulder of threads 61 will be located and bearing against the lowermost shoulder of the threads 47. The threads 61 will be spaced outward from the nose 48, with a significant clearance located between the nose 48 and the threads 61. In this running position, the lock ring 57 will be retained on its lower end by the retainer ring 49.

Lock ring 57 has on its exterior a protruding band or profile 63. Profile 63 locates near the bottom of the lock ring 57. Profile 63 has a generally upward and outward facing frusto-conical shoulder 63a. Shoulder 63a matches the taper of the groove shoulder 15a (FIG. 1). A portion of profile 63 below the shoulder 63a is cylindrical and engages the reduced diameter section 33 while the assembly is in the running position shown in FIG. 2 In this position, a locking pin 65 engages a split 67 (FIG. 3) formed in the lock ring 57. The locking pin 65 prevents rotation of the lock ring 57 relative to the funnel 23.

The lock ring 57 is resilient and has an outer diameter at profile 63 that is larger than the diameter of the reduced diameter section 33 when the lock ring 57 is not compressed. It is compressed significantly in the running position shown in FIG. 2. When the lock ring 57 moves below the reduced diameter section 33 and to a point adjacent the grooves 15, it springs outward into the uppermost groove 15. Locking pin 65 allows this downward movement of the lock ring 57 relative to the tieback connector body 21, but prevents the lock ring 57 from rotating relative to the body 21.

In operation, as shown in FIG. 1, the tieback connector 19 will be lowered on riser conduit over the wellhead housing 11. The seat 26 will land on the rim 17. The lockdown sub 39 will be carried in an upper recessed position shown in FIGS. 1 and 2. The threads 35 will retain the lockdown sub 39 in this recessed position. The nose 48 will be located only a slight distance lower than the seat 26 while the lockdown sub 39 is in this recessed position.

Then, a conventional running tool 69 will be lowered through the riser. The running tool 69 has a dog 71 that will be urged outward. Dog 71 will engage the slot 53 located in the lockdown sub 39. Running tool 69 will be lowered on a string of pipe such as drill pipe.

The operator will rotate the string of pipe to rotate the running tool 69. This will cause the lockdown sub 39 to rotate. There will be sufficient friction between the funnel seat 26 and the wellhead housing 11 to prevent the tieback connector body 21 from rotating at this time. The threads 41 (FIG. 2) will unscrew from the threads 35. The entire assembly of the lockdown sub 39 will then drop downward. The profile 63 will slide out of the reduced diameter section 33, slide down the bore 31 and spring outward once reaching the top groove 15. The resiliency of the lock ring 57 causes this outward movement, and causes the profile 63 to snap into engagement with the groove 15.

The operator then rotates the running tool 69 again. The threads 47 will screw into the threads 61. The locking pin 65 prevents rotation of the lock ring 57. The lockdown sub 39 will thus move downward relative to the lock ring 57. The downward facing shoulder 45 will engage the upward facing shoulder 37. As the rotation causes the threads to tighten, the shoulders 45 and 37 will bear tightly against each other. This thread makeup causes the profile shoulder 63a to exert an upward force against the groove shoulder 15a. This tightly compresses the seal 27 against the rim 17 and preloads the entire connection. Once the desired torque has been reached, the operator will pull upward on the running tool 69 to retrieve the running tool to the surface.

The invention has significant advantages. The tapered threaded surfaces located between the lock ring and lockdown sub allow a large amount of preload force to be applied to the connection. No additional threads are necessary within the bore of the wellhead housing While the invention has been shown in only one of its forms, it should be apparent to those skilled in the art that it is not so limited, but is susceptible to various changes without departing from the scope of the invention.

We claim:

1. In a tieback system for a subsea well, having a subsea wellhead housing with an upper rim, a tieback connector having a body secured to a string of riser and a funnel extending downward for sliding over the wellhead housing, the body having a downward facing seat for landing on the rim of the wellhead housing, the body having an axial bore containing an upward facing shoulder, an improved means for connecting the tieback connector to the wellhead housing, comprising in combination:

an internal circumferential groove formed in the wellhead housing;

a lockdown sub carried in the bore of the body, having an exterior containing a downward facing shoulder and a tapered surface spaced below the downward facing shoulder;

a set of threads formed on the tapered surface of the lockdown sub;

a split lock ring having a protruding profile on its exterior adapted to engage the internal groove in the wellhead housing, the lock ring having a bore containing a set of threads adapted to engage the threads on the tapered surface of the lockdown sub;

means in the bore of the body and on the exterior of the lockdown sub for carrying the lockdown sub in an upper recessed position with the downward facing shoulder of the lockdown sub spaced above the shoulder in the bore, and for allowing the lockdown sub to be lowered to a locking position with the downward facing shoulder of the lockdown sub engaging the shoulder in the bore after the seat of the body lands on the rim of the wellhead housing;

means for carrying the lock ring on the exterior of the lockdown sub in a lower position relative to the lockdown sub while the lockdown sub is in the upper recessed position; and means for preventing the lock ring from rotating relative to the lockdown sub while the lockdown sub moves into the locking position, allowing the threads of the lockdown sub to be rotated relative to the threads of the lock ring, causing the lockdown sub to move downward relative to the lock ring, urging the profile of the lock ring outward into the internal groove of the wellhead housing and tightening the seat of the body against the rim.

2. In a tieback system for a subsea well, having a subsea wellhead housing with an upper rim, a tieback connector having a body secured to a string of riser and a funnel extending downward for sliding over the wellhead housing, the body having a downward facing seat for landing on the rim of the wellhead housing, the body having an axial bore containing an upward facing shoulder, an improved means for connecting the tieback connector to the wellhead housing, comprising in combination:

an internal groove formed in the wellhead housing, having a downward facing frusto-conical shoulder;

a lockdown sub carried in the bore of the body, having an exterior containing a downward facing shoulder and a frusto-conical surface spaced below the downward facing shoulder;

a set of threads formed on the frusto-conical surface of the lockdown sub;

a split lock ring having a bore containing a set of threads adapted to engage the threads on the frusto-conical surface of the lockdown sub;

a profile on the exterior of the lock ring adapted to engage the internal groove in the wellhead housing, the profile having an upward facing frusto-conical surface for engaging the downward facing frusto-conical shoulder of the internal groove in the wellhead housing;

means in the bore of the body and on the exterior of the lockdown sub for carrying the lockdown sub in an upper recessed position with the downward facing shoulder of the lockdown sub spaced above the shoulder in the bore, and for allowing the lockdown sub to be lowered to a locking position with the downward facing shoulder of the lockdown sub engaging the shoulder in the bore after the seat of the body lands on the rim of the wellhead housing;

means for carrying the lock ring on the exterior of the lockdown sub in a lower position relative to the lockdown sub while the lockdown sub is in the upper recessed position; and means for preventing the lock ring from rotating relative to the lockdown sub while the lockdown sub moves downward into the locking position, allowing the threads of the lockdown sub to be rotated relative to the threads of the lock ring, causing the lockdown sub to move downward relative to the lock ring, urging the profile of the lock ring outward into the internal groove of the wellhead housing and tightening the seat of the body against the rim.

3. In a tieback system for a subsea well, having a subsea wellhead housing with an upper rim, a tieback connector having a body secured to a string of riser and a funnel extending downward for sliding over the wellhead housing as the riser is lowered into the sea, the body having a downward facing seat for landing on the rim of the wellhead housing, the body having an axial bore containing an upward facing shoulder, an improved means for connecting the tieback connector to the wellhead housing, comprising in combination:

an internal groove formed in the wellhead housing, having a downward facing frusto-conical shoulder;

a lockdown sub carried in the bore of the body, having an exterior containing a downward facing shoulder and a frusto-conical surface spaced below the downward facing shoulder;

a set of threads formed on the frusto-conical surface of the lockdown sub;

a split lock ring having a bore containing a set of threads adapted to engage the threads on the frusto-conical surface of the lockdown sub;

a profile on the exterior of the lock ring adapted to engage the internal groove in the wellhead housing, the profile having an upward facing frusto-conical surface for engaging the downward facing frusto-conical shoulder of the internal groove in the wellhead housing;

means in the bore of the body and on the exterior of the lockdown sub for carrying the lockdown sub in an upper recessed position with the downward facing shoulder of the lockdown sub spaced above the shoulder in the bore, and for allowing the lockdown sub to be lowered to a locking position with the downward facing shoulder of the lockdown sub engaging the shoulder in the bore after the seat of the body lands on the rim of the wellhead housing;

the bore of the body having a reduced diameter section extending downward from the shoulder;

means for carrying the lock ring on the exterior of the lockdown sub in a lower position relative to the lockdown sub while the lockdown sub is in the upper recessed position;

the lock ring having an exterior that engages the reduced diameter section in the bore of the body while the lockdown sub is in the upper recessed position, the exterior of the lock ring having a diameter greater than said reduced diameter section to compress the lock ring while the lock ring exterior engages said reduced diameter section, and causing the lock ring to spring out into engagement with the internal groove of the wellhead housing as the lockdown sub and lock ring move downward relative to the body to the locking position of the lockdown sub; and means for preventing the lock ring from rotating relative to the lockdown sub while the lockdown sub moves downward to the locking position, allowing the threads of the lockdown sub to be rotated relative to the threads of the lock ring, causing the lockdown sub to move downward relative to the lock ring, urging the profile of the lock ring outward into the internal groove of the wellhead housing and tightening the seat of the body against the rim.

* * * * *